United States Patent
Nomura et al.

(10) Patent No.: US 11,555,644 B2
(45) Date of Patent: Jan. 17, 2023

(54) INSULATED COOLER SYSTEM

(71) Applicant: Wool Street LLC, Portland, OR (US)

(72) Inventors: David Lee Nomura, Portland, OR (US); Brook Alison McLeod, Portland, OR (US)

(73) Assignee: Wool Street LLC, Portland, OR (US)

( * ) Notice: Subject to any disclaimer, the term of this patent is extended or adjusted under 35 U.S.C. 154(b) by 302 days.

(21) Appl. No.: 16/875,768

(22) Filed: May 15, 2020

(65) Prior Publication Data
US 2020/0370820 A1  Nov. 26, 2020

Related U.S. Application Data

(60) Provisional application No. 62/850,451, filed on May 20, 2019.

(51) Int. Cl.
| | | |
|---|---|---|
| *F25D 23/06* | (2006.01) | |
| *F25D 23/02* | (2006.01) | |
| *A47J 47/00* | (2006.01) | |
| *F25D 3/06* | (2006.01) | |

(52) U.S. Cl.
CPC .......... *F25D 23/065* (2013.01); *A47J 47/005* (2013.01); *F25D 3/06* (2013.01); *F25D 23/028* (2013.01); *F25D 2201/124* (2013.01); *F25D 2303/08* (2013.01)

(58) Field of Classification Search
CPC ........ F25D 3/06; F25D 23/065; F25D 23/028; F25D 2201/124; F25D 2303/08; A47J 47/005; B65D 81/3813; B65D 81/3818; B65D 81/3823
See application file for complete search history.

(56) References Cited

U.S. PATENT DOCUMENTS

| | | | | | |
|---|---|---|---|---|---|
| 5,549,052 | A | * | 8/1996 | Hoffman | A47B 9/00 108/138 |
| 5,597,199 | A | * | 1/1997 | Hoffman | A47B 85/00 297/188.1 |
| 6,398,272 | B1 | * | 6/2002 | Plummer | E05C 19/06 292/249 |
| 10,712,070 | B1 | * | 7/2020 | Touchton | F25D 21/14 |
| 2003/0157284 | A1 | * | 8/2003 | Tanimoto | B65D 81/3897 428/36.1 |
| 2007/0163475 | A1 | * | 7/2007 | Murphy | A47B 9/00 108/147 |
| 2016/0135559 | A1 | * | 5/2016 | Scally | F25D 23/12 220/592.03 |
| 2017/0027314 | A1 | * | 2/2017 | Guzman | A47B 33/00 |
| 2018/0009576 | A1 | * | 1/2018 | Sullivan | B65D 51/1683 |
| 2020/0017277 | A1 | * | 1/2020 | Moon | B65D 43/167 |

* cited by examiner

*Primary Examiner* — Matthew W Ing
(74) *Attorney, Agent, or Firm* — Klarquist Sparkman, LLP (57) ABSTRACT

An insulating apparatus can include a base portion, a side portion, and an upper portion. Each portion can include a double walled configuration with a gap defining an insulation volume therebetween. The base portion, the side portion, and the upper portion collectively define an interior volume of the insulating apparatus. In one embodiment, the base wall, first side wall, and first upper wall are stainless steel, and the second base wall, second side wall, and second upper wall are aluminum, and wool batting is positioned in the insulation volume, the second insulation volume, and the third insulation volume.

20 Claims, 11 Drawing Sheets

INSULATED COOLER SYSTEM

CROSS REFERENCE TO RELATED APPLICATION

This application claims with benefit of U.S. Provisional Patent Application No. 62/850,451, filed May 20, 2019. The prior application is incorporated herein by reference in its entirety.

FIELD

The present disclosure relates to portable coolers, and more specifically to ice coolers for recreational use.

BACKGROUND

Recreational coolers are used for a variety of purposes and events, including on camping trips, at beach gatherings, backyard BB Qs, and picnics. Conventional coolers are formed from injection molded or rotomolded plastic-bodied materials with polyurethane or polystyrene foam embedded within for insulation. The bulk of the cooler market is at a relatively affordable price point and has an average capacity of 40-60 quarts. Conventional coolers, however, suffer from a number of shortcomings and improvements in performance and materials are desirable.

DETAILED DESCRIPTION

The present disclosure relates to a cooler system that exhibits a high-level of performance using at least some recycled components. In some embodiments, the cooler system can comprise a sheet metal and natural wool construction, which allows most of the cooler to be recycled at a scrap yard at the end-of-life.

In some embodiments, the cooler system comprises two layers of light gauge sheet metal, preferably aluminum or stainless steel, with a predetermined amount of separation. In some embodiments, embedded between the two walls of sheet metal can be a layer of wool, which acts as the insulating material. The wool can be composted at the end-of-life. Thus, in some embodiments, the cooler system provides consumers with the option of a reusable cooler that can be recycled and/or compost at the end-of-life.

General Considerations

The following is a detailed description of various embodiments of the present invention. The aforementioned drawings are referenced to serve as some, not all, of the visual embodiments of the invention. It should be understood that all description and drawings are to be considered exemplification of the invention and is not intended to limit the invention to the specific embodiments described and illustrated below.

The systems and methods described herein, and individual components thereof, should not be construed as being limited to the particular uses or systems described herein in any way. Instead, this disclosure is directed toward all novel and non-obvious features and aspects of the various disclosed embodiments, alone and in various combinations and subcombinations with one another. For example, any features or aspects of the disclosed embodiments can be used in various combinations and subcombinations with one another, as will be recognized by an ordinarily skilled artisan in the relevant field(s) in view of the information disclosed herein. In addition, the disclosed systems, methods, and components thereof are not limited to any specific aspect or feature or combinations thereof, nor do the disclosed things and methods require that any one or more specific advantages be present or problems be solved.

As used in this application the singular forms "a," "an," and "the" include the plural forms unless the context clearly dictates otherwise. Additionally, the term "includes" means "comprises." Further, the term "coupled" or "secured" encompasses mechanical and chemical couplings, as well as other practical ways of coupling or linking items together, and does not exclude the presence of intermediate elements between the coupled items unless otherwise indicated, such as by referring to elements, or surfaces thereof, being "directly" coupled or secured. Furthermore, as used herein, the term "and/or" means any one item or combination of items in the phrase.

As used herein, the term "exemplary" means serving as a non-limiting example, instance, or illustration. As used herein, the terms "e.g.," and "for example," introduce a list of one or more non-limiting embodiments, examples, instances, and/or illustrations.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the detailed description, claims, abstract, and drawings.

The Disclosed Technology

Various cooler systems and methods of manufacturing the same are disclosed herein, including various cooler systems with double-wall metal construction with an insulating material such as sheep's wool embedded in between. The cooler systems disclosed herein are portable and can be used in a variety of activities, including, for example, camping, glamping, barbequing, picnicking, backyard parties, beach bonfires and/or gatherings, hunting, and fishing.

As described in more detail herein, in one embodiment, an insulating apparatus can comprise a base portion comprising base wall and base wall spaced apart from the base wall to form a first gap having a first insulation volume; a side portion comprising a first side wall and side wall spaced apart from the side wall to form a second gap having a second insulation volume; an upper portion comprising upper wall and upper wall spaced apart from the upper wall to form a third gap having a third insulation volume; and a plurality of hinge members movably coupling the upper portion to the side portion. The base portion, the side portion, and the upper portion collectively define an interior volume of the insulating apparatus. In one embodiment, the base wall, first side wall, and first upper wall are stainless steel, and the second base wall, second side wall, and second upper wall are aluminum, and wool batting is positioned in the insulation volume, the second insulation volume, and the third insulation volume.

Figure 1A:
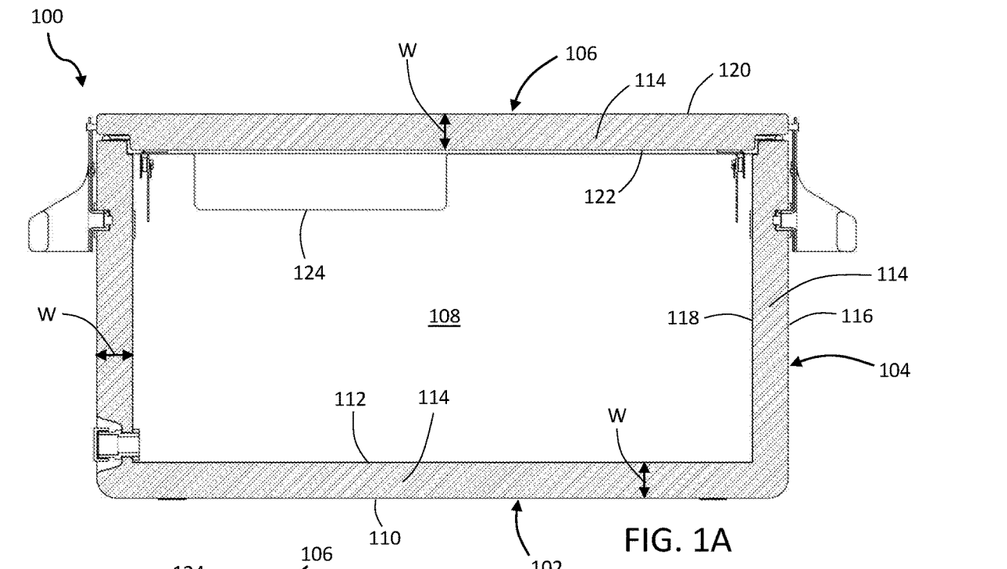
FIGS. 1A-1C show cross-sectional views of a double-walled cooler system comprising wool insulation.
Figure 1B:
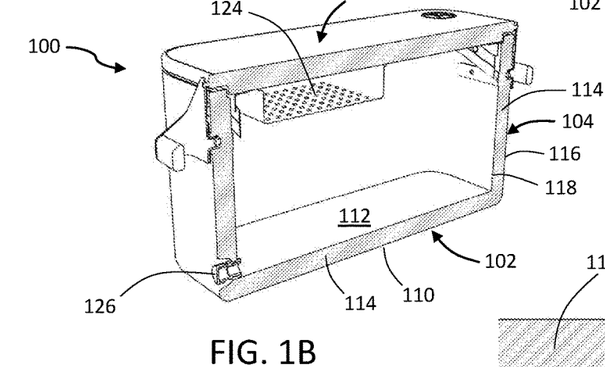
Figure 1C:
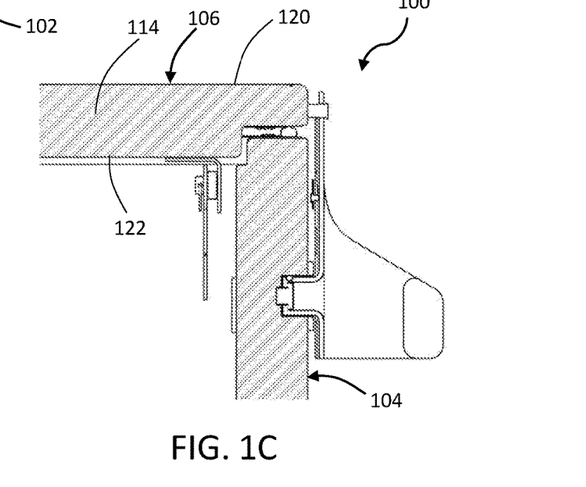

FIGS. 1A-1C show various cross-section views of an exemplary cooler system 100. Cooler system 100 can include a double-walled sheet metal construction and wool insulation as described in more detail herein. Cooler system 100 comprises a base portion 102, a side portion 104 and a top portion 106, which collectively define an enclosed space 108.

Base portion 102 comprises a first base wall 110 and base wall 112 with insulation 114 provided therebetween. Similarly, side portion 104 comprises a first side wall 116 and side wall 118 with insulation 114 provided therebetween, and upper portion 106 (e.g., a lid) comprises a first upper wall 120 and upper wall 122 with insulation 114 provided therebetween.

Figure 2:
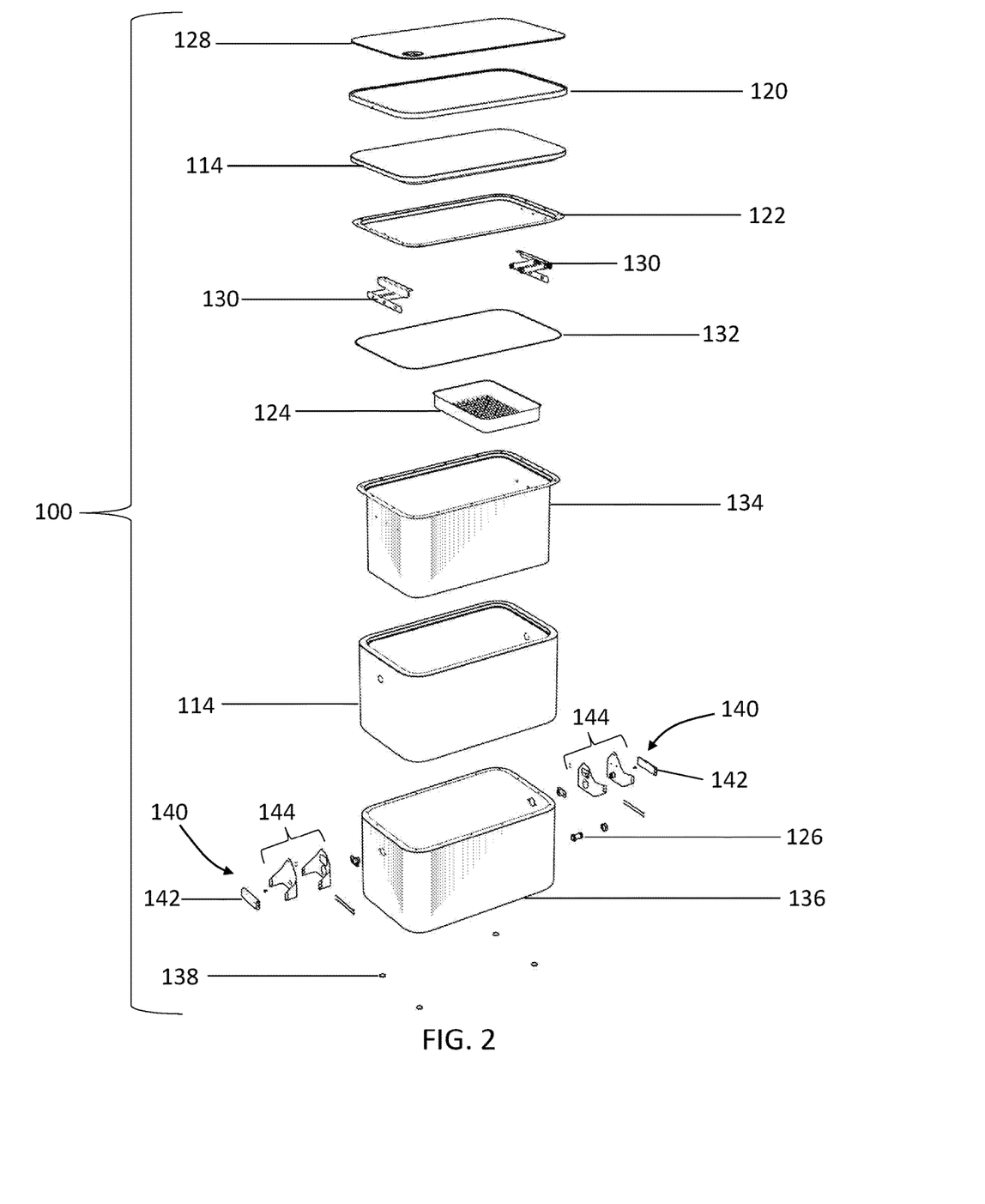
FIG. 2 shows an exploded view of an exemplary double-walled cooler system.

As shown in FIG. 1B and FIG. 2, in some embodiments, cooler system 100 can also comprise one or more internal trays 124 and one or more drain systems 126.

The first and second base walls 110, 112, first and second side walls 116, 118, and first and second upper walls 120, 122, define a gap therebetween for receiving the insulation. In some embodiments, a width w of the gap can be about 1 inch generally throughout. In other embodiments, the width w can be between 0.5 and 2 inches, or between about 0.75 and 1.25 inches.

In some embodiments, the outer walls (e.g., first base wall 110, first side wall 116, and first upper wall 120) can be formed from aluminum, e.g., a sheet metal layer of 22-gauge aluminum. 22-gauge aluminum can provide reduced weight, ease of manufacturing, recyclability, and additional finish options.

The inner walls (e.g., second base wall 112, second side wall 118, and second upper wall 122) can be formed from different materials. In one embodiment, the inner walls can be formed from a sheet metal layer of 28-gauge stainless steel, which can provide corrosion resistance, food safe properties, and recyclability.

Preferably, the insulation is provided by a wool layer. The wool layer can comprise 100% sheep's wool that has been carded and batted. Wool batting is the preferred embodiment because of its uniform density and thickness. In addition, the malleability of wool batting lends itself to be easily wrapped around forms, aiding in assembly.

FIG. 2 illustrates an exploded view of an exemplary cooler system 100. In this embodiment, the top of the upper portion 106 can include a cutting board 128 that is received in a recess of first upper wall 120. The cutting board 128 can be formed of any suitable material, such as bamboo which is naturally antimicrobial, water resistant, and compostable.

The first upper wall 120 can be configured to receive and support the cutting board 128. As discussed above, first upper wall 120 can comprise an aluminum sheet metal layer and the second upper wall 122 can be formed of stamped stainless-steel sheet metal, both of which can be stamped, for example, into the desired shapes for the and second upper wall 120, 122. The layer of sheep's wool batting 114 can be positioned between the upper wall 120 and the second upper wall 122.

In one embodiment, a pair of hinges 130 can be coupled to opposite sides of the second upper wall 122 and to the second side wall 118 to allow the opening and closing of the upper portion 106. The hinges can be selected to allow the upper portion 106 to remain horizontal in both the closed position (FIG. 3) and open position (FIG. 4).

A rubber gasket 132 can extend around the perimeter of the upper portion 106 to provide an airtight seal between the upper portion 106 and side portion 104. The tray 124 can be supported by the side portion 104. In some embodiments, the tray 124 can include a perforated bottom for easy water drainage, and can easily be removed or slid left or right within the cooler.

The second side wall 118 and the second bottom wall 112 can collectively form an inner vessel 134. In some embodiments, the vessel 134 can be a single deep-drawn stainless-steel part, keeping the piece seamless and watertight. In other embodiments, the vessel 134 can be formed from multiple parts that mate together and are welded at the seams. The first side wall 116 and first bottom wall 110 can collectively form an outer structure 136. In some embodiments, outer structure 136 can be formed from two parts that mate together, such as at the centerline. By forming the vessel and outer structure in this manner, both components can be stamped and heat-treated in mass production. In other embodiments, outer structure 136 can be a single deep-drawn aluminum part, keeping the piece seamless and watertight. FIG. 2 also illustrates a layer of sheep's wool batting 114 positioned between the vessel 134 and outer structure 136, thereby enveloping all of sides of the vessel 134.

Figure 5A:
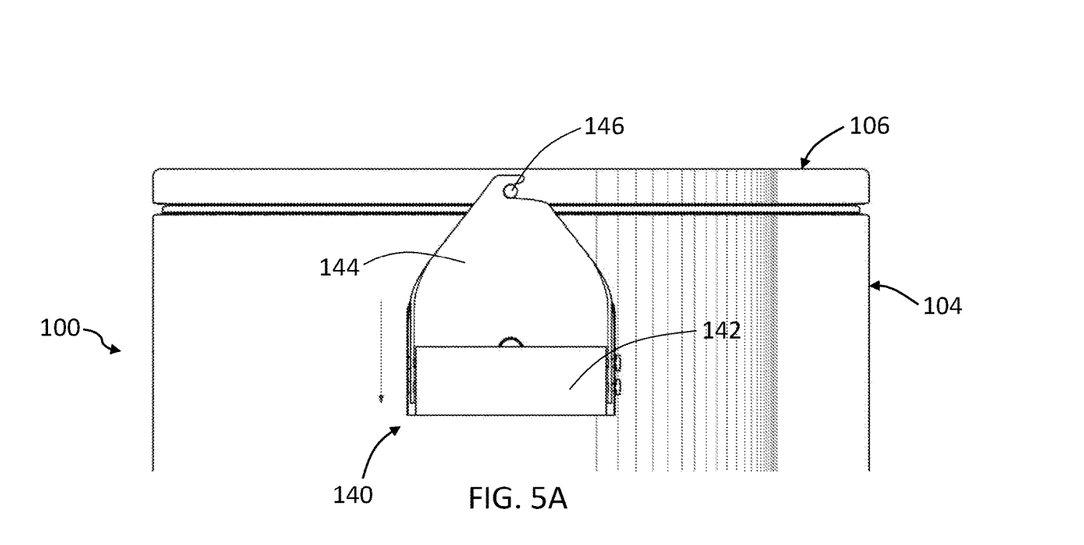
FIGS. 5A and 5B illustrate a closure latching handle that secures the lid to the body of the cooler.
Figure 5B:
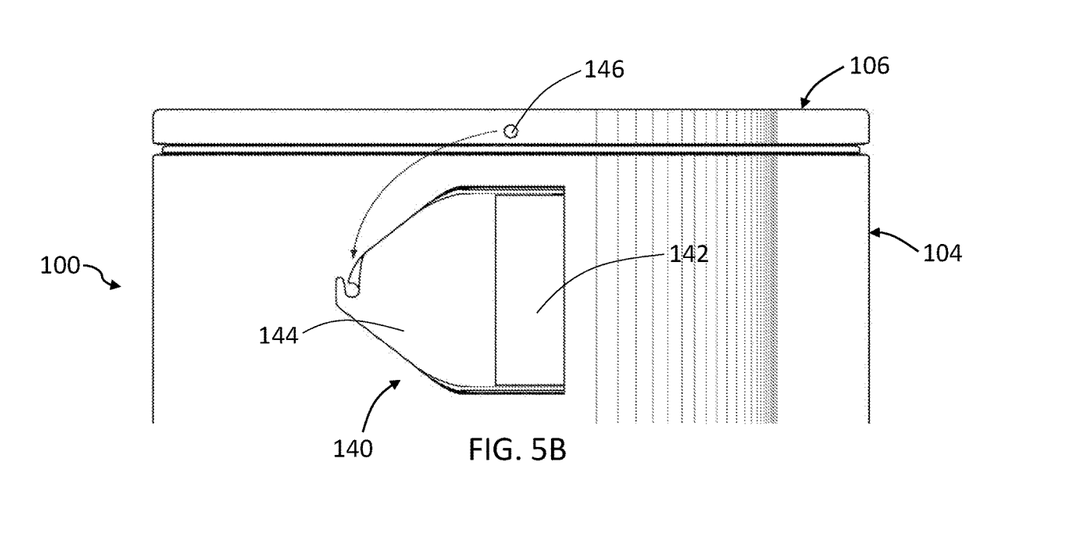

A plurality of rubber members 138 (e.g., feet) can be provided along the bottom surface of the cooler system 100 keep the cooler firmly planted on smooth surfaces. A pair of handles 140 can be provided on the sides of the cooler system 100. In some embodiments, the handles 140 can also serve to secure the upper portion 106 in the closed position. For example, handles 140 can comprise a gripping portion 142 (e.g., a bamboo grip) and a rotatable handle brackets 144 (e.g., aluminum brackets), which can rotate 90 degrees to engage with pins 146 on the upper portion 106 of the cooler system to secure the lid in the closed position (FIGS. 5A and 5B).

As shown in FIGS. 1B and 2, the drainage spout 126 extends through the outer structure, the vessel, and wool insulation, and terminates against the inside wall of the vessel 134.

Figure 3:
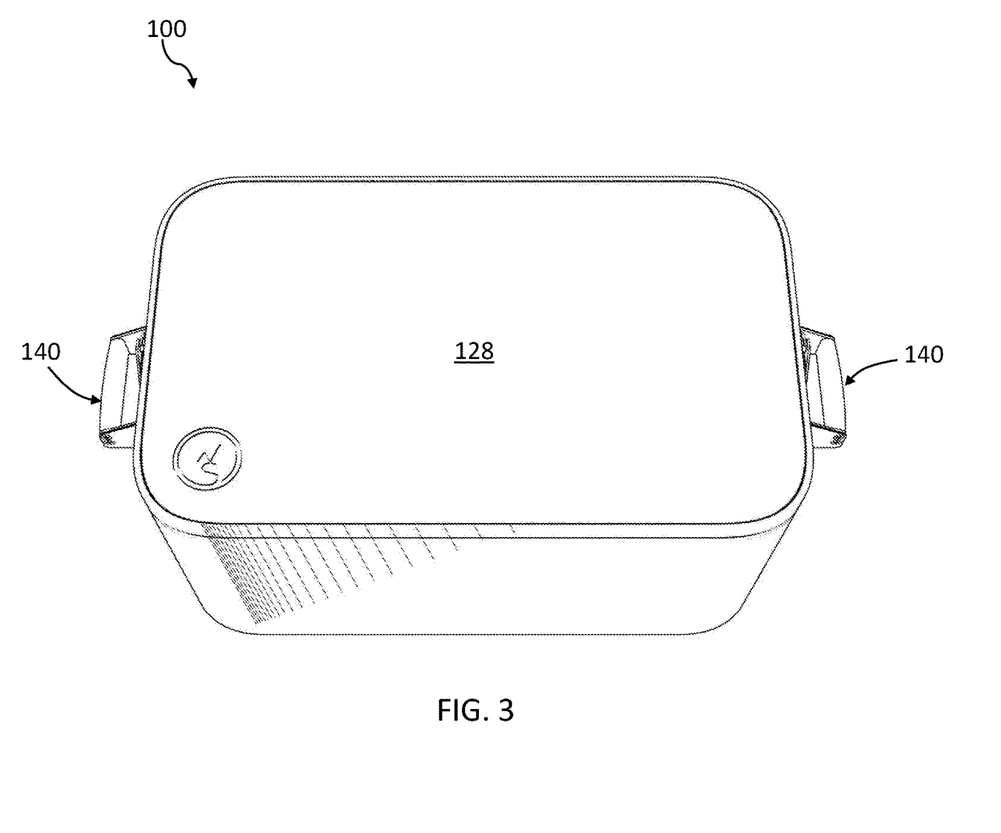
FIG. 3 shows a top perspective view of a built-in cutting board recessed in the lid.

FIG. 3 is a detailed view of the lid, showing the recessed cutting board 128. Preferably, the cutting board is formed from bamboo, which is a sustainable material that can be harvested in a matter of months, and is naturally antimicrobial and fully compostable.

Figure 4A:
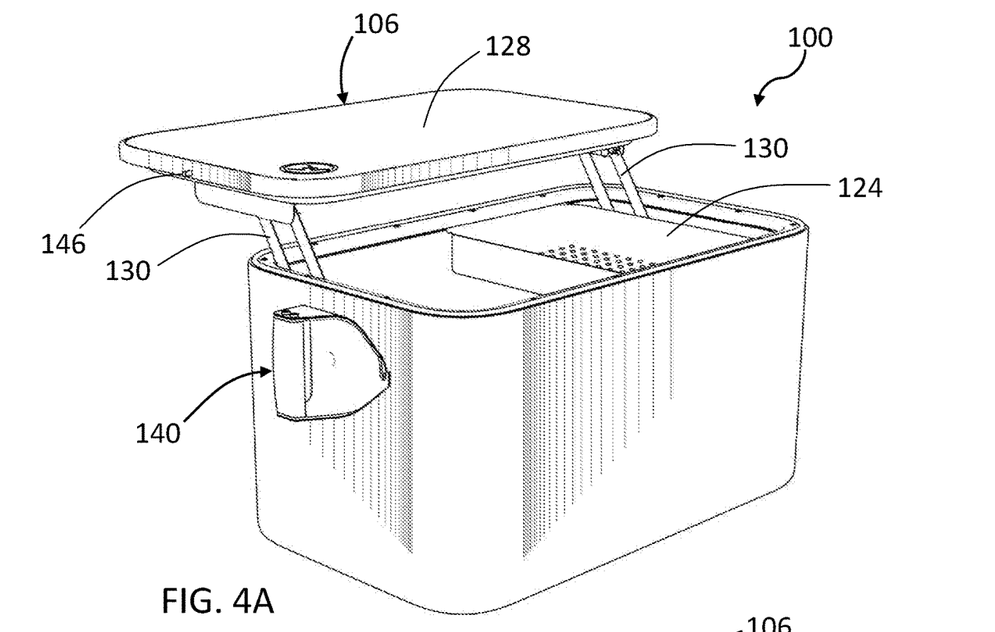
FIGS. 4A and 4B show a perspective view of the hinge system which allows the lid to open and close in a substantially horizontal orientation.
Figure 4B:
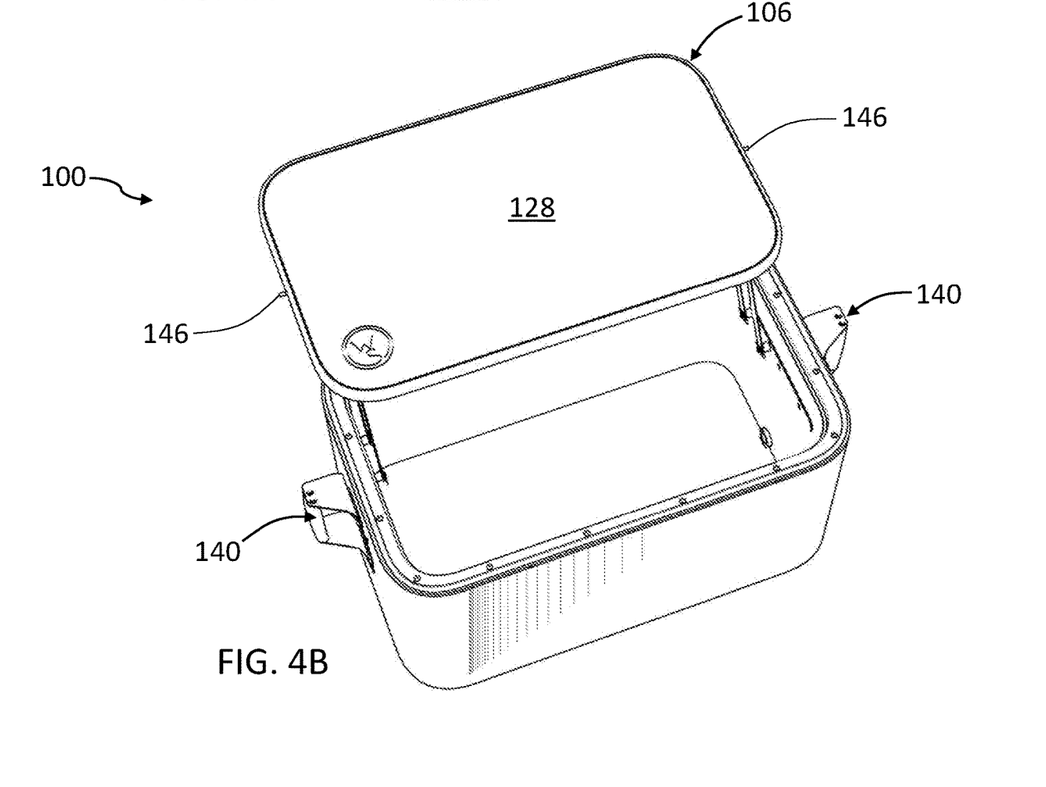

FIGS. 4A and 4B shows how the upper portion 106 opens while maintaining a generally horizontal orientation relative to the ground, or a surface on which the cooler system 100 rests. Thus, the upper portion 106 and integrated cutting board 128 can be kept generally parallel to the ground plane at all times. As used herein, "generally horizontal" refers to an orientation which is horizontal or approximates a horizontal surface by being within 5 degrees or less of a horizontal ground plane.

Each of the two hinges 130 can be formed from two stamped stainless-steel arms of equal length that articulate around hinge pins at each end, and which are attached to stamped stainless steel plates affixed to the inside of the cooler body and lid.

FIGS. 5A and 5B show an exemplary embodiment in which the handles 140 can pivot about a pivot axis to move from a closed position (FIG. 5A) in which the rotatable handle brackets 144 are engaged with a pin 146 of the upper portion 106, to an open position (FIG. 5B) in which the rotatable handle brackets 144 do not engage with pin 146 thereby allowing the upper portion 106 to move relative to side portion 104. Thus, when the user wants to access the contents of the cooler system, he or she slides the latch formed by the rotatable handle brackets 144 from left to right to unlock it, and when finished, they close the upper portion 106 (i.e., lid) and slide the latch from right to left to lock it. In some embodiments, the latch can comprise a stamped metal C-shaped component mounted to the lid that grabs onto a mating bracket mounted to the body of the cooler system.

In use, the cooler system 100 can be carried to one's destination with the handles 140, preferably by two able-bodied people, each holding one handle. The gripping portion 142 of the handle can be made from bamboo, mounted to sturdy hardware. In some embodiments, the bamboo gripping portions 142 can slide a predetermined distance, enough for the user's hands to fit between the handle and cooler body when fully extended.

Figure 6:
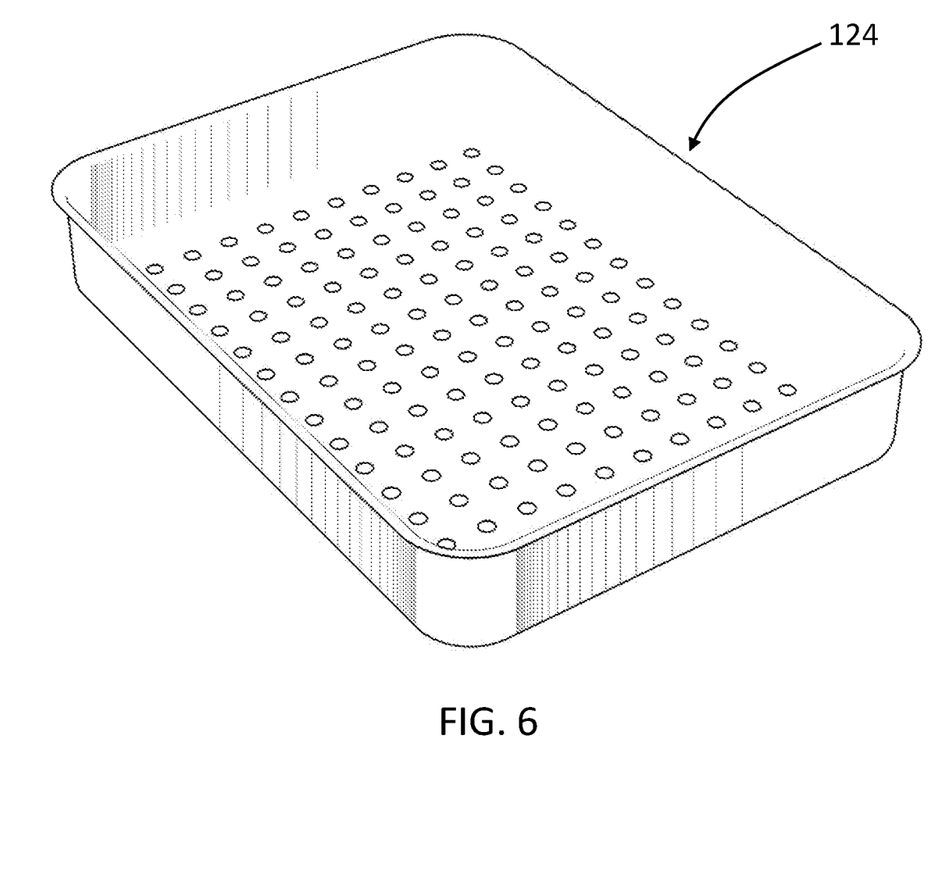
FIG. 6 depicts an optional removable tray.

FIG. 6 shows the removable tray 124, which can be formed from stainless steel and be sized to hold sandwiches, produce, or other items away from the area that contains ice and/or any ice/water mix. It can have multiple perforations on the bottom surface, allowing water to flow through.

Figure 7A:
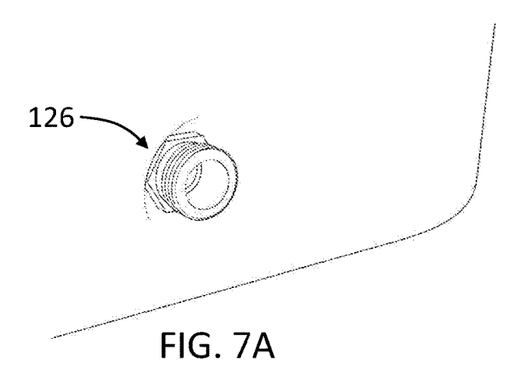
FIGS. 7A-7C show a side drainage spout and cap in all forms of use.
Figure 7B:
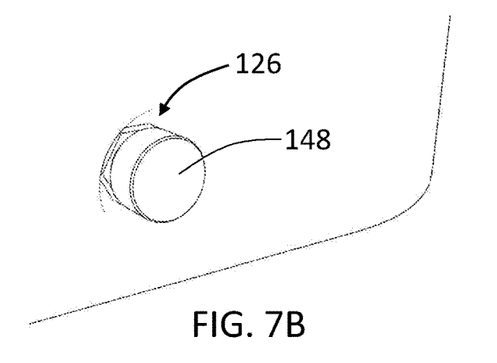
Figure 7C:
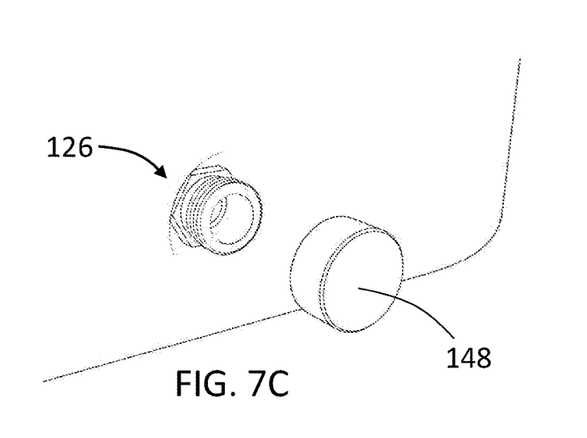

FIGS. 7A-7C illustrate an exemplary drain spout 126 with a removable internally threaded cap 148 that can be received on the externally threaded drain spout 126. In some embodiments, the cap 148 can comprise a knurled aluminum knob that unscrews to let the melted ice water out. The aperture of the drain spout 126 can be configured match with the American standard for household hoses so that the user can attach a hose and drain the water into a distant receptacle.

Figure 8A:
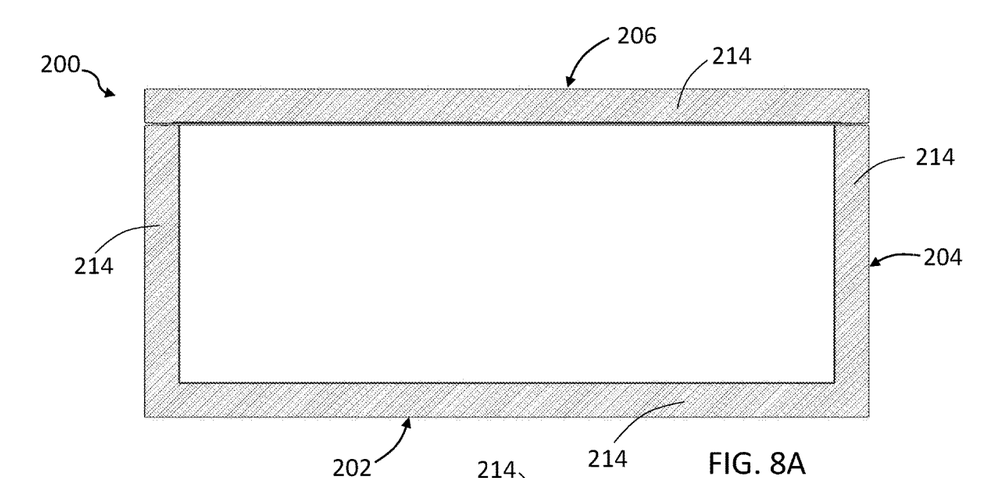
FIGS. 8A-8C show cross-sectional views of a simplified embodiment comprising an aluminum outer wall, wool insulation, and stainless-steel inner wall.
Figures 8B, 8C:
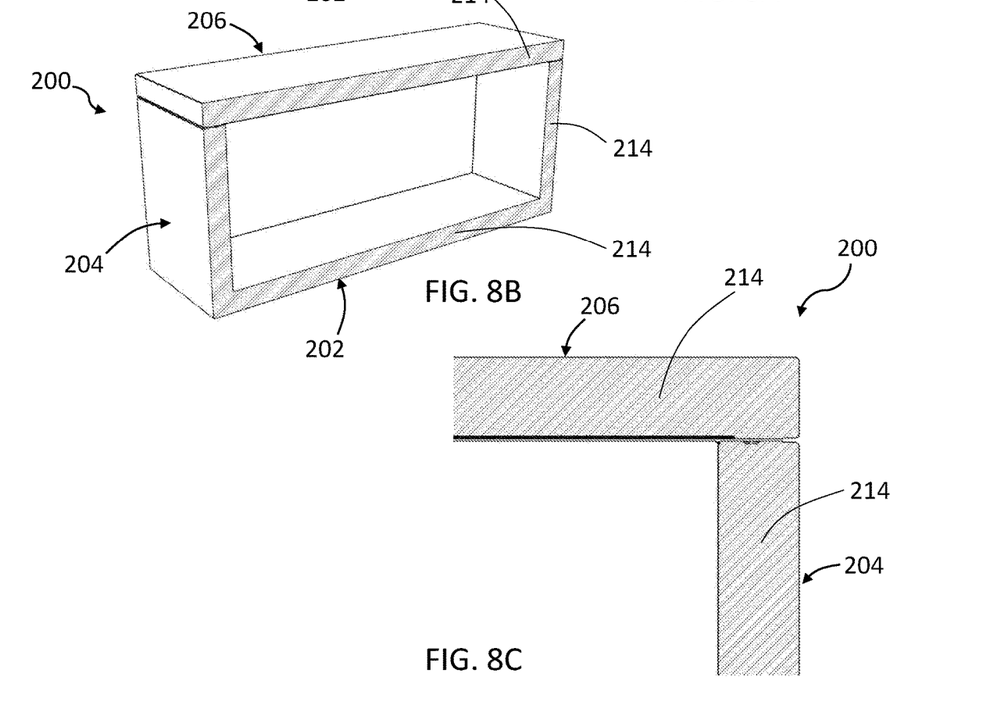
Figure 9:
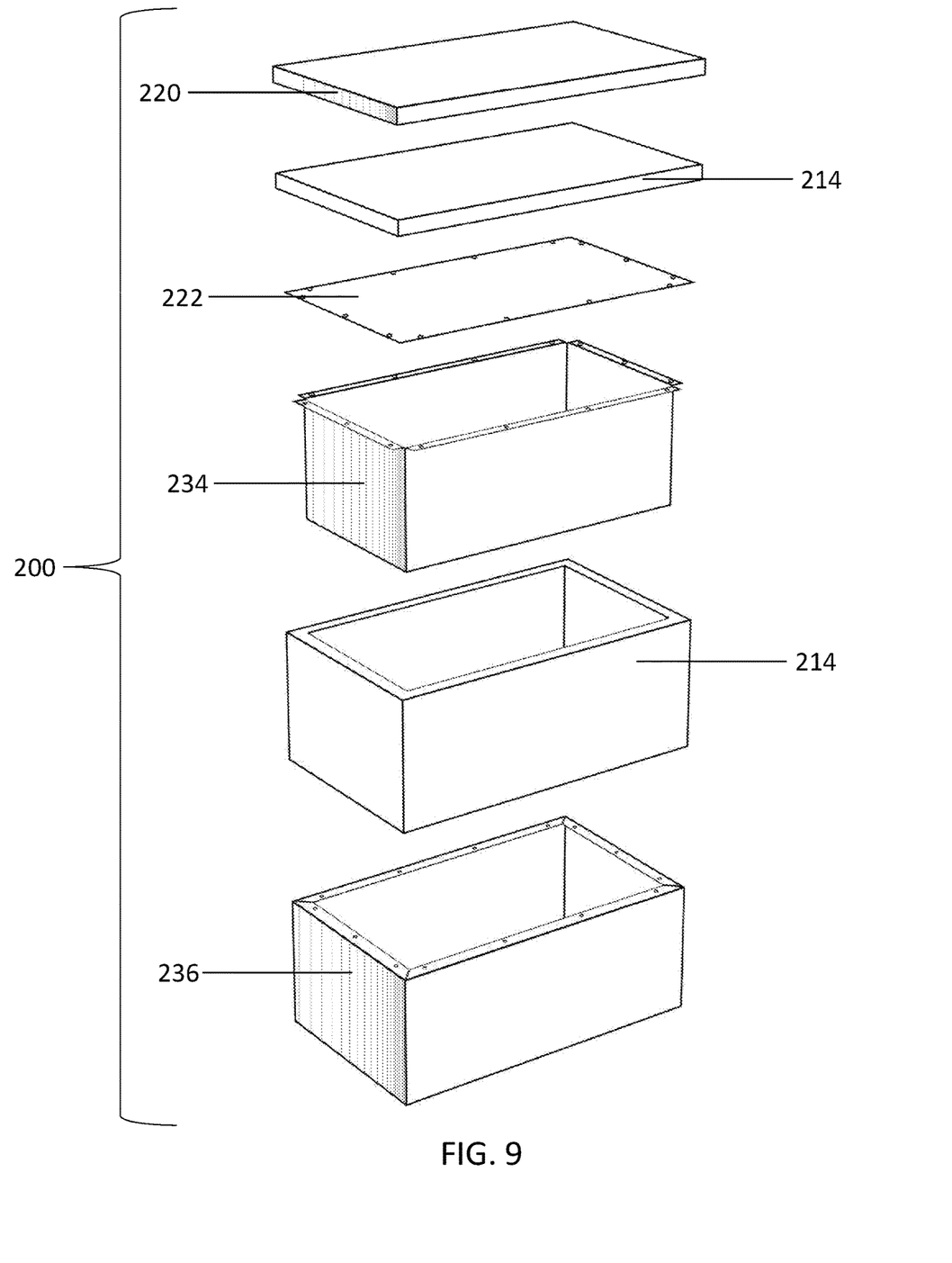
FIG. 9 depicts an exploded view of the cooler system shown in FIGS. 8A-8C.
Figure 10A:
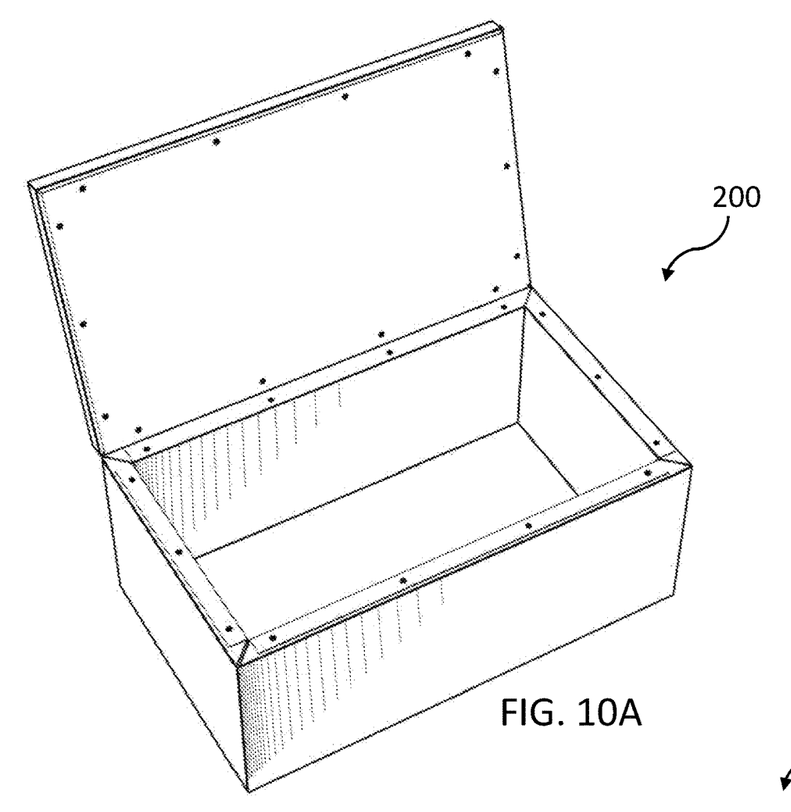
FIGS. 10A and 10B illustrates a simplified lid utilizing two hinges to open and close the cooler system.
Figure 10B:
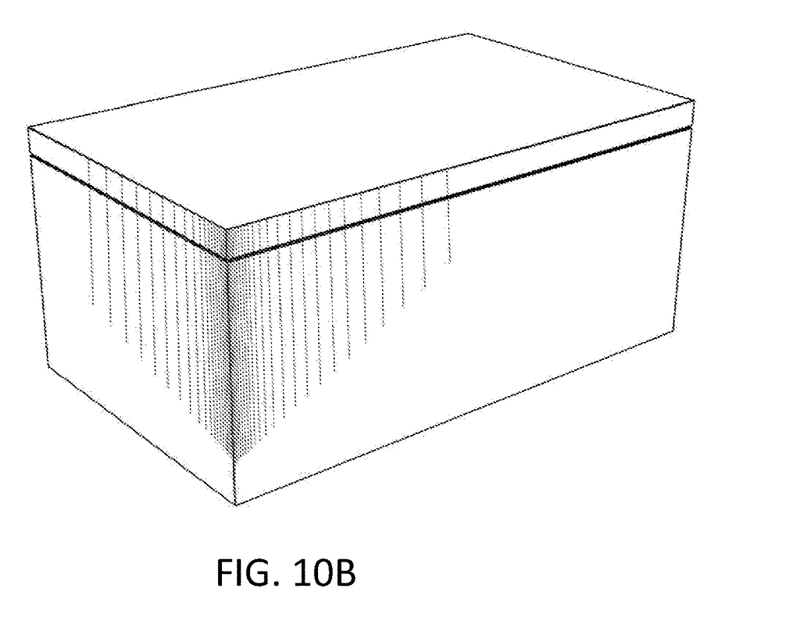

FIGS. 8A-8C shows cross-sectional views of a simplified embodiment of a cooler system 200, illustrating the double-walled sheet metal construction and wool insulation embedded within and as discussed herein. FIG. 9 is an exploded view of the simplified embodiment and FIGS. 10A and 10B show the simplified cooler system in an open (FIG. 10A) and closed (FIG. 10B) position. For convenience, like reference numbers are used in these figures when referring to similar structural components.

Referring to FIG. 9, the aforementioned outer structure 236 can comprise one aluminum sheet that is cut, bent, and welded together at the seams. The inner vessel 234 can comprise a single sheet of stainless steel that has been cut, bent and welded to keep the vessel watertight. In between the outer structure and inner vessel is a layer of sheep's wool insulation 214. The top of the upper portion (lid) can be made of another sheet of cut, bent and welded aluminum, while the bottom half is a stainless-steel sheet attached over the wool insulation.

FIGS. 10A and 10B shows how the simplified embodiment upper portion (lid) opens upward in a hinged manner.

The lid attaches to the body with two hinges screwed to the exterior of the aluminum outer wall. The lid closes flush with the body to create a seal.

In some embodiments, a ratio of the interior volume (i.e., enclosed space) to the void volume that receives insulation can range from 0.75:1 to 2:1 or 1.25:1 to 2:1, or in some embodiments, from 1.5:1 to 1.75:1, or in other embodiments from about 1.6:1 to 1.7:1. For example, in one embodiment, the volume of the enclosed space can be about 52 quarts (about 47,244 $cm^3$) and a void volume for insulation (e.g., wool) can be about 30,037 $cm^3$, which provides a ratio of about 1.64:1. The table below illustrates exemplary embodiments for a 52 quart cooler.

| Interior Volume ($cm^3$) | Insulation Void Volume ($cm^3$) | Insulating Performance Ratio |
|---|---|---|
| 47,244 | 63,000 | 0.75:1 |
| 47,244 | 37,800 | 1.25:1 |
| 47,244 | 30,037 | 1.64:1 |
| 47,244 | 23,622 | 2:1 |

Figure 11:
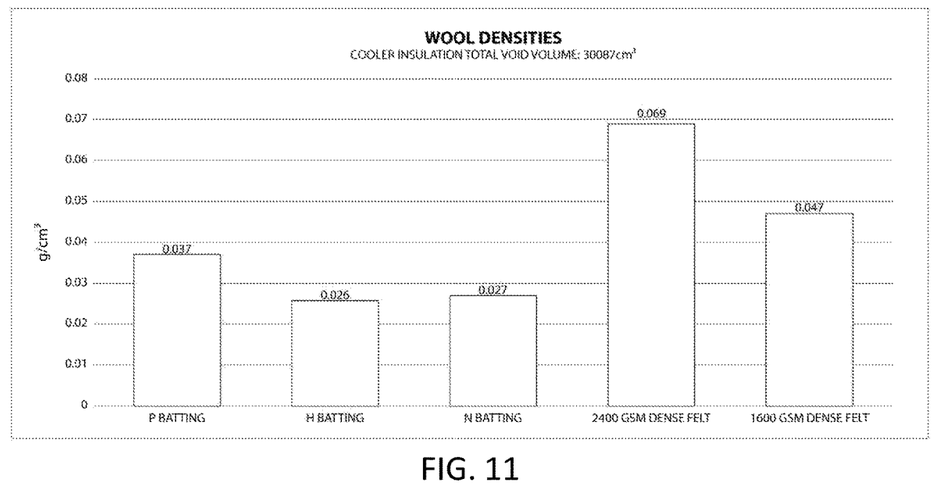
FIG. 11 is a chart showing exemplary wool densities.

FIG. 11 illustrates exemplary wool products and their densities, which can be suitable for use as insulation in the exemplary cooler system. In some embodiments, a density of the wool used in the cooler system is less than 0.05 $g/cm^3$ (excluding the 2400 GSM dense felt) or, more preferably, less than 0.04 $g/cm^3$ (e.g., including the P Batting, H Batting, and N Batting). In still other embodiments, the density of the wool insulation is less than 0.03 $g/cm^3$ (e.g., the H Batting and N Batting).

Figure 12:
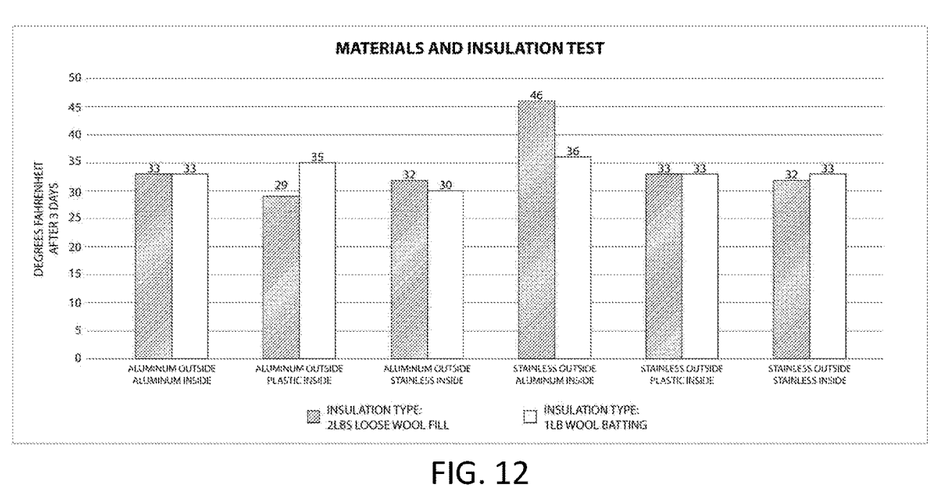
FIG. 12 is a chart showing the results of testing of different materials and insulation.

FIG. 12 illustrates the results of testing of different materials for the inner and outer walls of an exemplary cooler system and different insulation materials. As shown in FIG. 12, an aluminum exterior wall and a stainless-steel interior structure performed very well, especially when combined with wool batting insulation.

Although the preferred embodiments described herein use an aluminum/stainless steel combination for the inner and outer walls (i.e., inner vessel and outer structure), other combinations (which may be less advantageous for one or more reasons) are possible, including those disclosed in FIG. 11.

In at least some embodiments, the cooler systems disclosed herein provide a number of different advantages over conventional coolers, including for example, that most conventional coolers do not use recyclable or compostable materials. Instead, they generally utilize large pieces of plastic that ultimately end up in the landfill.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:
1. An insulating apparatus comprising:
   a base portion comprising an inner base wall and an outer base wall spaced apart from the inner base wall to form a first gap having a first insulation volume;
   a side portion comprising an inner side wall and an outer side wall spaced apart from the inner side wall to form a second gap having a second insulation volume;

an upper portion comprising an inner upper wall and an outer upper wall spaced apart from the inner upper wall to form a third gap having a third insulation volume; and a plurality of hinge members movably coupling the upper portion to the side portion, wherein the base portion, the side portion, and the upper portion collectively define an interior volume of the insulating apparatus, wherein the inner base wall, inner side wall, and inner upper wall are stainless steel, and the outer base wall, outer side wall, and outer upper wall are aluminum, and wherein wool batting is positioned in the insulation volume, the second insulation volume, and the third insulation volume.

2. The insulating apparatus of claim 1, wherein a density of the wool batting is less than 0.05 g/cm$^3$.

3. The insulating apparatus of claim 1, wherein a density of the wool batting is less than 0.04 g/cm$^3$.

4. The insulating apparatus of claim 1, wherein a density of the wool batting is less than 0.03 g/cm$^3$.

5. The insulating apparatus of claim 1, wherein a ratio of the interior volume to a total volume of the, second, and third insulation volumes ranges from 0.75:1 to 2:1.

6. The insulating apparatus of claim 1, wherein a ratio of the interior volume to the total volume of the, second, and third insulation volumes ranges from 1.5:1 to 1.75:1.

7. The insulating apparatus of claim 1, wherein a ratio of the interior volume to the total volume of the, second, and third insulation volumes ranges from 1.6:1 to 1.7:1.

8. The insulating apparatus of claim 1, wherein the upper portion is moveable from a closed position to an open position, and the plurality of hinge members are configured to maintain a generally horizontal orientation of a top surface of the upper portion as it moves from the closed position to the open position.

9. The insulating apparatus of claim 8, wherein the top surface of the upper portion comprises a cutting board.

10. The insulating apparatus of claim 9, wherein the cutting board is wood.

11. The insulating apparatus of claim 9, wherein the cutting board is flush mounted in a recess formed in the outer upper wall.

12. The insulating apparatus of claim 1, further comprising a pair of rotatable handle members coupled to the side portion or upper portion, the rotatable handle members being configured to rotate and engage with a corresponding locking members on the other one of the side or upper portion.

13. The insulating apparatus of claim 12, wherein the pair of rotatable handle members are coupled to the side portion and the corresponding locking members comprise a pin extending from a side surface of the upper portion.

14. The insulating apparatus of claim 1, wherein the inner base wall and the inner side wall are integrally formed as a single, watertight vessel.

15. An insulating apparatus comprising:
a base portion comprising an inner base wall and an outer base wall spaced apart from the inner base wall to form a first gap having a first insulation volume;
a side portion comprising an inner side wall and an outer side wall spaced apart from the inner side wall to form a second gap having a second insulation volume;
an upper portion comprising an inner upper wall and an outer upper wall spaced apart from the inner upper wall to form a third gap having a third insulation volume; and
a plurality of hinge members movably coupling the upper portion to the side portion,
wherein the base portion, the side portion, and the upper portion collectively define an interior volume of the insulating apparatus,
wherein the inner base wall, inner side wall, and inner upper wall are stainless steel, and the outer base wall, outer side wall, and outer upper wall are aluminum,
wherein wool batting is positioned in the insulation volume, the second insulation volume, and the third insulation volume, the wool batting having a density of less than 0.05 g/cm$^3$, and
a ratio of the interior volume to the total volume of the, second, and third insulation volumes ranges from 0.75:1 to 2:1.

16. The insulating apparatus of claim 15, wherein the density of the wool batting is less than 0.04 g/cm$^3$ and the ratio of the interior volume to the total volume of the, second, and third insulation volumes ranges from 1.5:1 to 1.75:1.

17. The insulating apparatus of claim 15, wherein the density of the wool batting is less than 0.03 g/cm$^3$ and the ratio of the interior volume to the total volume of the, second, and third insulation volumes ranges from 1.6:1 to 1.7:1.

18. The insulating apparatus of claim 15, wherein the upper portion is moveable from a closed position to an open position, and the plurality of hinge members are configured to maintain a generally horizontal orientation of a top surface of the upper portion as it moves from the closed position to the open position.

19. The insulating apparatus of claim 18, wherein the top surface of the upper portion comprises a cutting board that is positioned within a recess in the outer upper wall.

20. The insulating apparatus of claim 15, further comprising a pair of rotatable handle members coupled to the side portion, the rotatable handle members being configured to rotate and engage with corresponding locking members on the upper portion.

* * * * *

UNITED STATES PATENT AND TRADEMARK OFFICE
CERTIFICATE OF CORRECTION

| | |
|---|---|
| PATENT NO. | : 11,555,644 B2 |
| APPLICATION NO. | : 16/875768 |
| DATED | : January 17, 2023 |
| INVENTOR(S) | : Nomura et al. |

It is certified that error appears in the above-identified patent and that said Letters Patent is hereby corrected as shown below:

In the Claims

Column 7, Lines 23-25, Claim 5 "The insulating apparatus of claim 1, wherein a ratio of the interior volume to a total volume of the, second, and third insulation volumes ranges from 0.75:1 to 2:1" should read -- The insulating apparatus of claim 1, wherein a ratio of the interior volume to a total volume of the first, second, and third insulation volumes ranges from 0.75:1 to 2: --

Column 7, Lines 26-28, Claim 6 "The insulating apparatus of claim 1, wherein a ratio of the interior volume to the total volume of the, second, and third insulation volumes ranges from 1.5:1 to 1.75:1" should read -- The insulating apparatus of claim 1, wherein a ratio of the interior volume to the total volume of the first, second, and third insulation volumes ranges from 1.5:1 to 1.75:1 --

Column 7, Lines 29-31, Claim 7 "The insulating apparatus of claim 1, wherein a ratio of the interior volume to the total volume of the, second, and third insulation volumes ranges from 1.6:1 to 1.7:1" should read -- The insulating apparatus of claim 1, wherein a ratio of the interior volume to the total volume of the first, second, and third insulation volumes ranges from 1.6:1 to 1.7:1 --

Column 8, Lines 29-33, Claim 16 "The insulating apparatus of claim 15, wherein the density of the wool batting is less than 0.04 g/cm$^3$ and the ratio of the interior volume to the total volume of the, second, and third insulation volumes ranges from 1.5:1 to 1.75:1" should read -- The insulating apparatus of claim 15, wherein the density of the wool batting is less than 0.04 g/cm$^3$ and the ratio of the interior volume to the total volume of the first, second, and third insulation volumes ranges from 1.5:1 to 1.75:1 --

Column 8, Lines 34-38, Claim 17 "The insulating apparatus of claim 15, wherein the density of the wool batting is less than 0.03 g/cm$^3$ and the ratio of the interior volume to the total volume of the, second, and third insulation volumes ranges from 1.6:1 to 1.7:1" should read -- The insulating apparatus of claim 15, wherein the density of the wool batting is less than 0.03 g/cm$^3$ and the ratio of the interior volume to the total volume of the first, second, and third insulation volumes ranges from 1.6:1 to 1.7:1 --

Signed and Sealed this
Fourth Day of July, 2023

Katherine Kelly Vidal
*Director of the United States Patent and Trademark Office*